Figure 5:
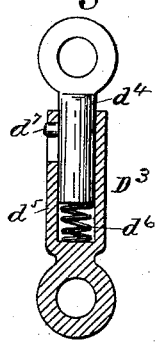

(No Model.) 6 Sheets—Sheet 1.
L. W. FIFIELD & A. I. JACOBS.
BOOK SEWING MACHINE.
No. 370,460. Patented Sept. 27, 1887.
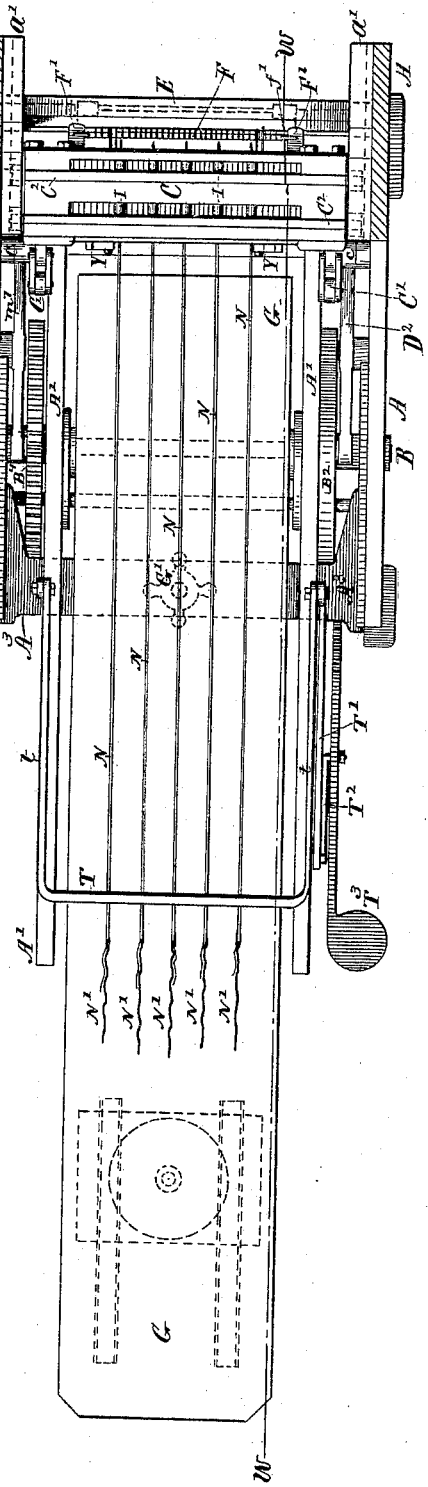
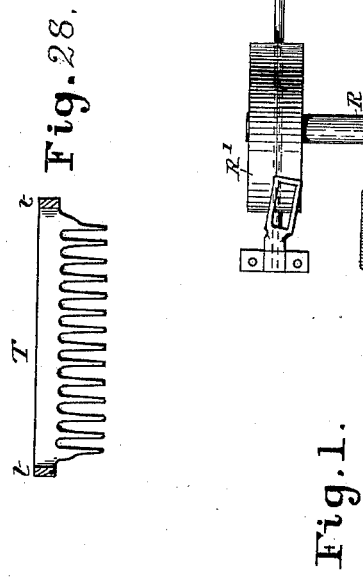
Fig. 1.
Fig. 28.
Inventors,
Levi W. Fifield
Arthur I. Jacobs
By Chas. H. Burleigh
Attorney
Witnesses,
Ella P. Blenus
C. R. Barton

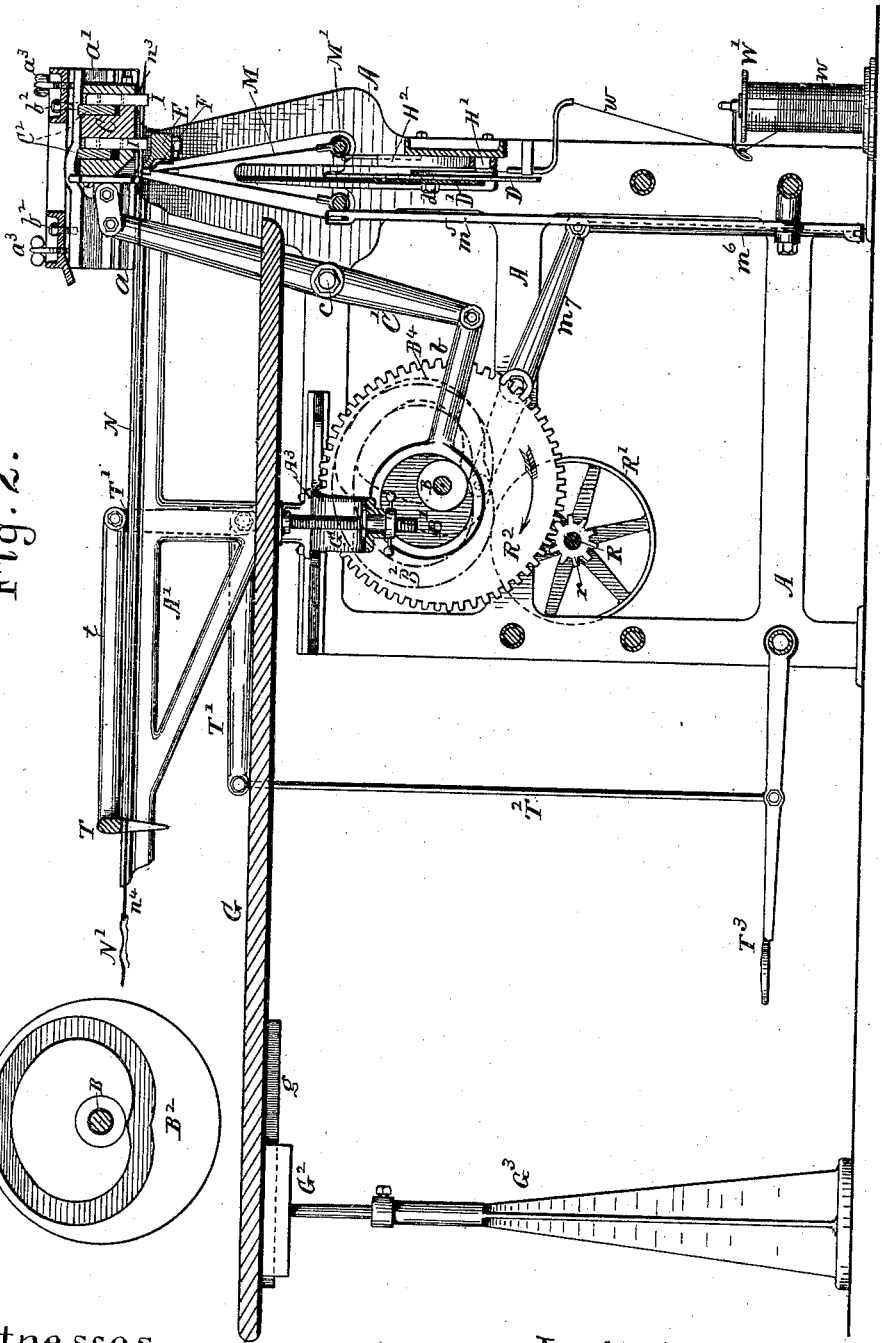

(No Model.) 6 Sheets—Sheet 3.

L. W. FIFIELD & A. I. JACOBS.
BOOK SEWING MACHINE.

No. 370,460. Patented Sept. 27, 1887.

Witnesses. Inventors.

(No Model.) 6 Sheets—Sheet 4.
L. W. FIFIELD & A. I. JACOBS.
BOOK SEWING MACHINE
No. 370,460. Patented Sept. 27, 1887.
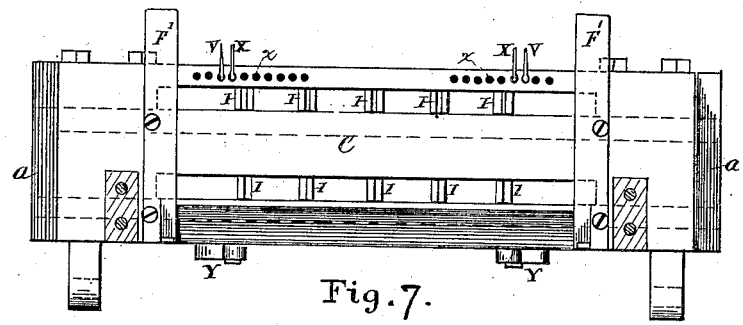
Fig. 7.
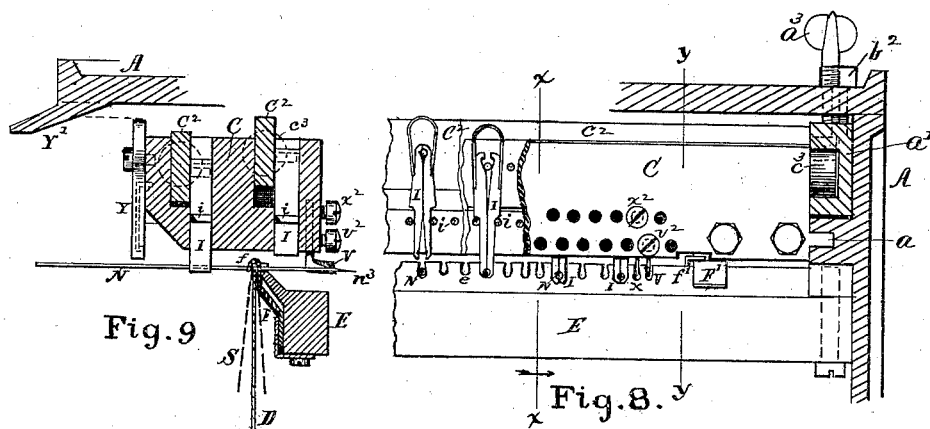
Fig. 9. Fig. 8.
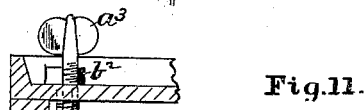
Fig. 11. Fig. 10.
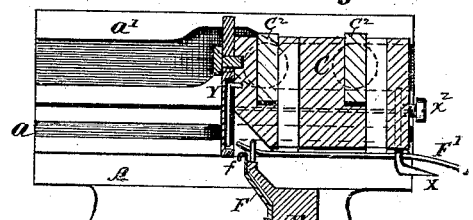
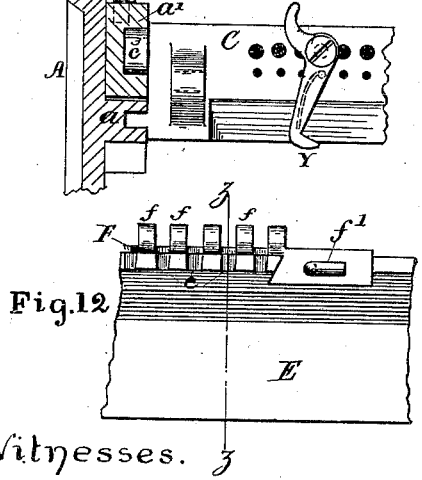
Fig. 12.
Witnesses.
Ella P. Blenus
A. R. Barton
Fig. 13.
Inventors
Levi W. Fifield
Arthur I. Jacobs
By Chas. H. Burleigh
Attorney
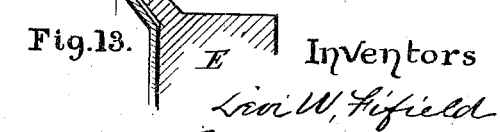

(No Model.) 6 Sheets—Sheet 5.
L. W. FIFIELD & A. I. JACOBS.
BOOK SEWING MACHINE.
No. 370,460. Patented Sept. 27, 1887.
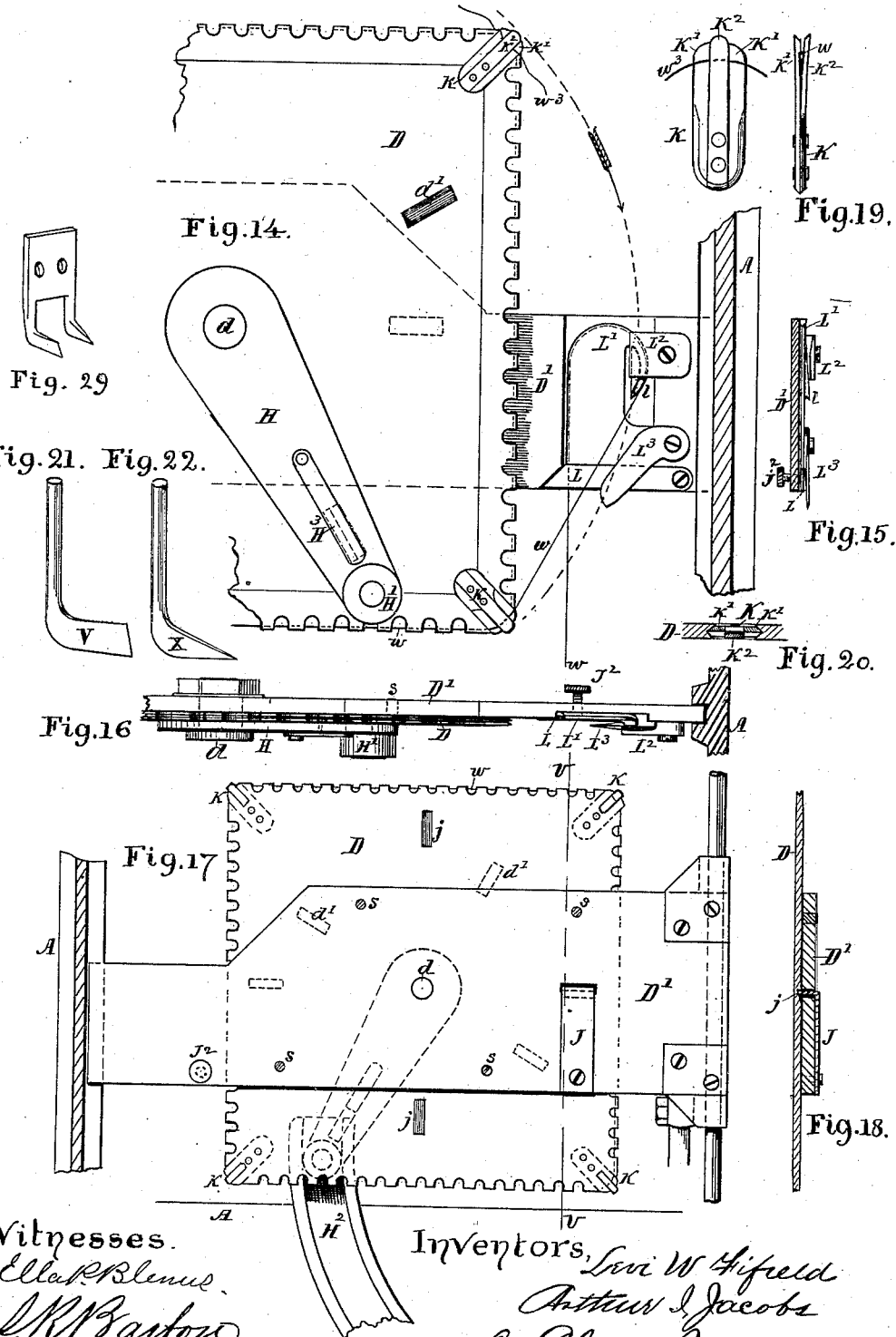

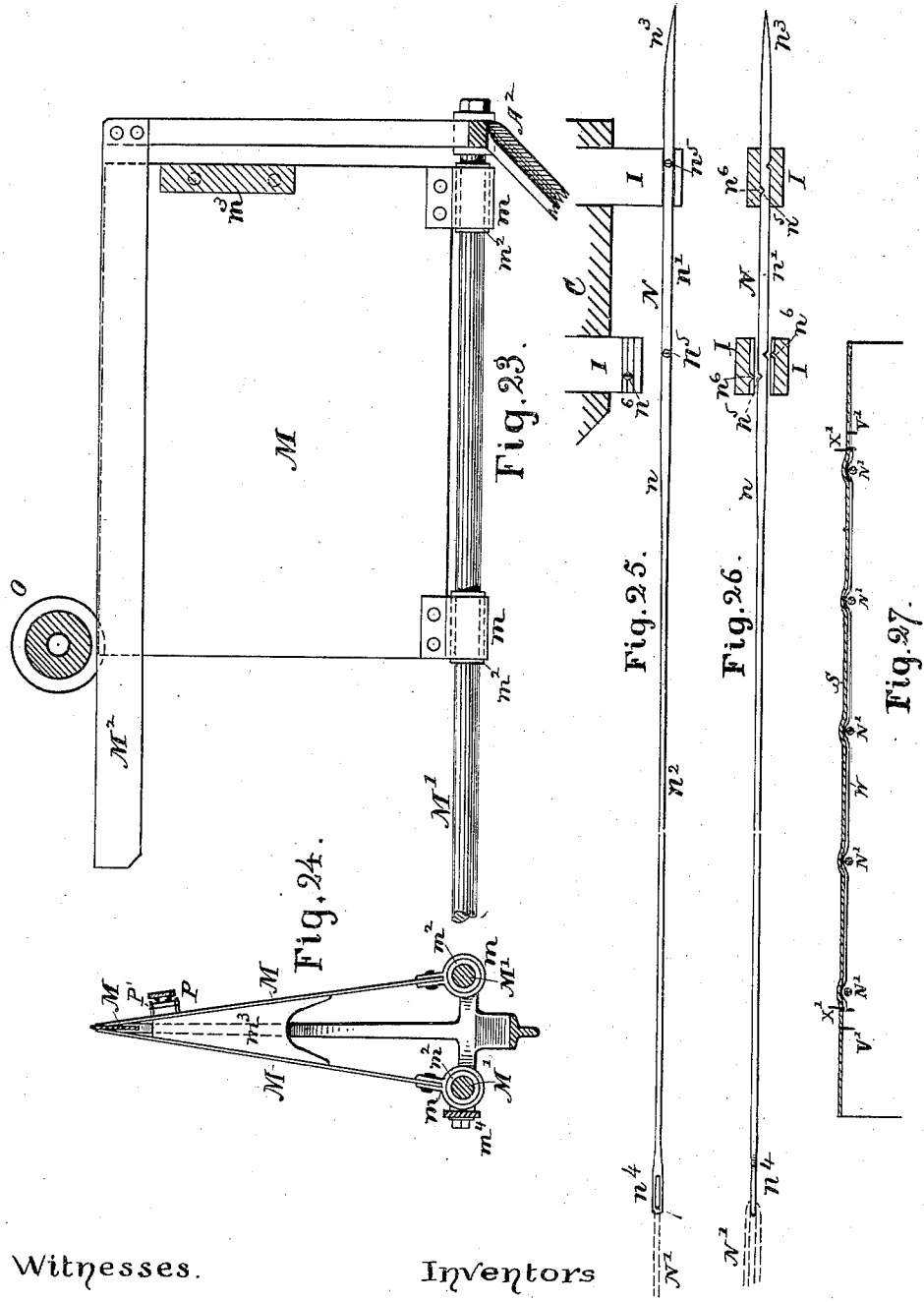

UNITED STATES PATENT OFFICE.

LEVI W. FIFIELD AND ARTHUR I. JACOBS, OF WORCESTER, MASSACHUSETTS, ASSIGNORS TO THE SMYTHE MANUFACTURING COMPANY, OF HARTFORD, CONNECTICUT.

BOOK-SEWING MACHINE.

SPECIFICATION forming part of Letters Patent No. 370,460, dated September 27, 1887.

Application filed August 23, 1886. Serial No. 211,580. (No model.)

*To all whom it may concern:*

Be it known that we, LEVI W. FIFIELD and ARTHUR I. JACOBS, both citizens of the United States, residing at Worcester, in the county of Worcester and State of Massachusetts, have invented certain new and useful Improvements in Machines for Sewing Books, of which the following, together with the accompanying drawings, is a specification sufficiently full, clear, and exact to enable persons skilled in the art to which this invention appertains to make and use the same.

The object of this our present invention is to provide a simple, practical, and efficient machine for sewing books in the process of binding; also, to construct and combine the mechanisms for performing the various functions in the operation of feeding, sewing, and delivering the books in such a manner as to afford facility of operation and adjustment, precision of execution, durability, speed, and high efficiency in service, convenience of attendance, and economy in the manufacture and maintenance of the machinery. These objects we attain by mechanism the nature, construction, and operation of which are illustrated in the drawings and explained in the following description, the several features of our invention being hereinafter more fully set forth, and the particular subject-matter claimed being hereinafter definitely specified.

Figures 4, 6:
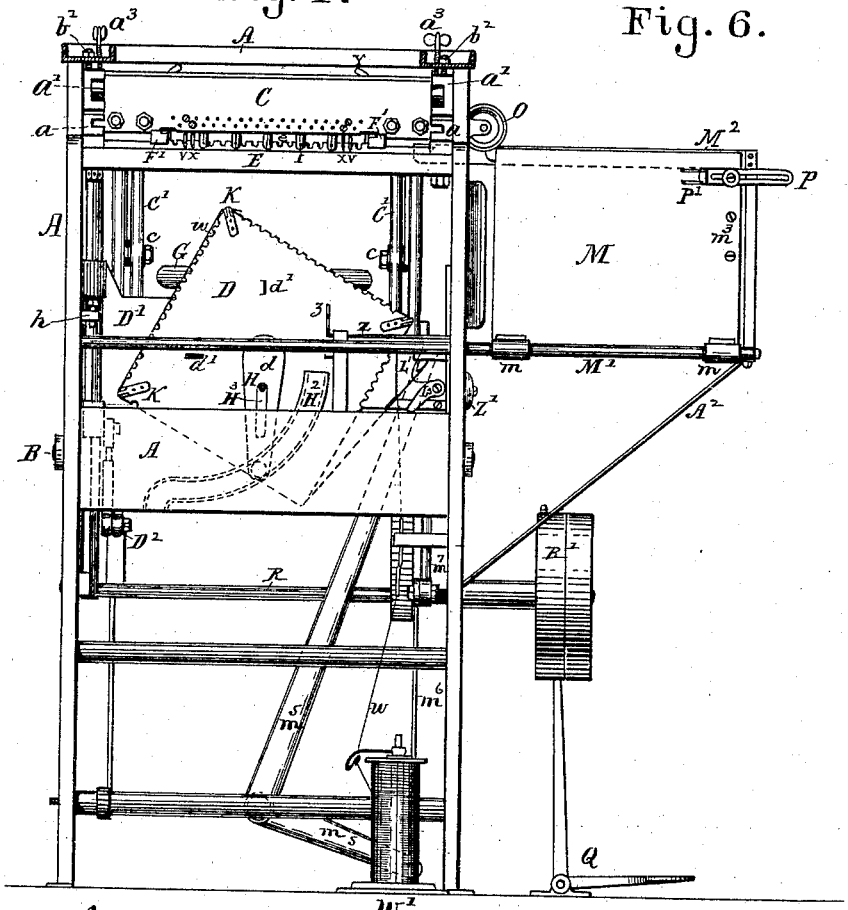

In the drawings, Figure 1 is a plan view of a machine for sewing books, illustrating the features of our invention. Fig. 2 is a vertical section at line $ww$ in Fig. 1. Fig. 3 shows the form of a cam for operating the mechanism that carries the strand of binding-wire. Fig. 4 is a front view of the machine. Fig. 5 is a sectional view of the yielding link for the strand mechanism, drawn to larger scale. Fig. 6 is a detail view of the feed alarm devices. Fig. 7 is a bottom view of the needle-carrier, drawn to larger scale. Fig. 8 is a part-front part-section view at one end of the needle-carrier, showing the gripping-jaws open and closed. Fig. 9 is a vertical section through the needle-carrier and cross-head at line $x\,x$ in Fig. 8. Fig. 10 is a similar section through the needle-carrier at line $y\,y$ in Fig. 8, showing the cam and guide, with the needle-carrier at forward position. Fig. 11 is a rear view of one end of the needle-carrier. Fig. 12 shows a portion of the cross-head and comb. Fig. 13 shows a section of the same at line $z\,z$ in Fig. 12. Fig. 14 is a front view of a part of the strand-carrier or binding-wire, feeding-plate, and tension devices. Fig. 15 is a vertical section of the tension devices. Fig. 16 is a plan view of the parts shown in Fig. 14. Fig. 17 is a rear view of the disk or strand-carrier and its supporting-bar. Fig. 18 is a vertical section at the line $v\,v$ in Fig. 17. Fig. 19 shows front and side of the wire holding and cutting device separate from the carrier-plate. Fig. 20 is a cross-section of the same. Fig. 21 is a view of the wire-cut-off knife separate from the carrier. Fig. 22 is a view of the tool or finger for raising the severed end of the binding-wire through the back of the signature. Fig. 23 is a longitudinal sectional view of the signature-feeding device. Fig. 24 is a transverse sectional view of the signature-feeding device. Fig. 25 is a side view of the needle and needle-gripping jaws. Fig. 26 is a top view of the needle and section of the gripping-jaws. Fig. 27 is a longitudinal section through a signature, showing the binding-wire as laid therein. Fig. 28 is a view showing the pusher or comb-bar for transferring the signatures from the ends of the needles onto the bands; and Fig. 29 shows the cut-off and bending tool, both formed on the single attaching-plate.

In our improved book-sewing machine the signatures are fed into the machine upon a reciprocating feeder, composed of upwardly-convergent leaves or inclined plates, and from which the signatures are lifted by the strand-carrier, which delivers the strand of binding-wire, and, forced against a comb or plate having a series of curved fingers, they are securely held in position while the needles are projected through them. Said needles are operated in connection with a reciprocating carrier or head provided with a series of gripping fingers or jaws that take hold of and release the needles as necessary for passing them through the work. The binding-wire is cut and its ends drawn through the back of the signature by devices provided for the purpose, and mechanism is provided for bending down the ends of the wire upon the back of the signature. The signatures as they accumulate are run out along the needles upon a support or table, and are drawn off onto the bands in sections or books of the desired numbers, a pusher or bar operated by suitable levers being provided therefor.

The features of construction, arrangement, and operation of the several mechanisms and devices will be understood from the following detailed description.

In reference to parts, A denotes the frame, of a suitable form to properly support the working mechanism. B indicates the cam-shaft, carrying cams and eccentrics, from which the several working parts derive motion. C indicates the reciprocating carrier or head, containing the needle-holding fingers; D, the strand carrier or plate for delivering and laying the binding-wire into the signatures; E, the cross-bar or supporting-bed, against which the signatures are sustained during the operation of sewing; F, the comb, guiding-stop, or signature-holder, for retaining the signatures in position for receiving the needles while sewing, and G the receiving-table, upon which the sewed books are delivered.

The carrier-head C is mounted in horizontal position at the upper part of the frame and supported at its ends by suitable guides, $a$, in such a manner as to reciprocate horizontally, motion being imparted thereto by levers $C'$, fulcrumed on the frame at $c$, the upper ends of said levers being linked to the carrier C and their lower ends connected to the arm $b$ of the eccentric-strap, which is actuated by eccentrics $B'$ and shaft B. Levers $C'$ are employed at the right and left of the machine, so as to give parallel action to the needle-carrying head.

Connected with the head are a series of gripping fingers or jaws, I, for holding the needles N, said fingers being arranged in a front and rear series, which alternately grasp and release the needles at the front and rear of the cross-bar E as the head reciprocates past the signature-supporting comb F, which is mounted thereon, the jaws being released and elevated as they pass the comb and depressed and gripped onto the needles after they have passed the position of the comb in both the forward and backward action, one set of the jaws grasping the needle while the other is released, and vice versa, so the needle is held at all times either by one set of jaws or the other. Said gripping-fingers are operated by transverse bars $C^2$, arranged in the head or carrier, with their ends provided with projections and anti-friction rolls $c^3$, that travel in the grooves of cam plates or guides $a'$, attached to the side frame, as illustrated.

The jaw-fingers I are supported in grooves in the head C by means of a series of pins or back-supporters, $i$, (see Fig. 8,) and are lifted, depressed, and closed by means of pins $I'$, fixed in the bars $C^2$, which pins work in connection with inclined and overhanging surfaces at the upper ends of the fingers, one of said pins $I'$ being employed as a follower or operator for each of the respective pairs of jaw-fingers, and occupying a position in the wedge-shaped space between the upper ends thereof, substantially as shown. The particular construction, arrangement, and operation of gripping-fingers of the nature of these here employed form the subject-matter of a separate application, Serial No. 211,583, and as a mechanical movement is set forth in the specification and claims of said application. The jaw-fingers I can readily be adjusted to different positions in the carrier-head for supporting the needles in proper positions to correspond to the requirements of different sizes of books.

The cam-plates $a'$ are connected with the top of the frame by screws or bolts $b^2$, and set-screws $a^3$ are arranged in the frame to screw down on the top of the cam-plates, as indicated, so that by turning the screws $b^2$ and $a^3$ said cam-plates can be adjusted for properly controlling the action of the gripping-fingers.

The needles N are made substantially as illustrated in Figs. 25 and 26, that portion $n'$ of the needle beneath the carrier C being preferably made larger in diameter than the following portion or backwardly-extending shaft $n^2$ of the needle, the needle-shaft being tapered as at $n$, at a position corresponding with the position at which the signature-supporting devices leave the signature upon the needles, when the latter have been passed through them, so that the incline or taper $n$ will act to carry the signatures backward with the backward movement of the needles, but will allow the needles to be easily drawn forward through the signature, since the latter portion, $n^2$, of the needle is smaller than the part $n'$, by which the hole in the signature is formed. The point of the needle is made straight on the lower side, the whole of the taper being from the top and side, as shown at $n^3$. The purpose of this construction is to cause the needles to readily pass under the binding-wire and to force the binding-wire and displaced substance upward toward the back of the signature as the needle is passed through. The needle is provided with an eye, $n^4$, at or near its rear end, through which to thread the cord or tape, of which the cross-bands N' in the back of the books is formed.

To avoid the possibility of the needles slipping from or becoming displaced in the needle-holding jaws, we provide small notches or depressions $n^5$ in the sides of the needle, and corresponding lugs or projections, $n^6$, in the groove or gripping-face of the jaws I, so that when the jaws close together the lugs enter the notches and support the needle in the manner illustrated in Fig. 26. The notches are preferably made offsetting at opposite sides of the needle, as indicated, and the lug $n^6$ on the jaws is so disposed that the jaws can be reversed and used at either side of the needle, or in any position in the carrier, the series of jaw-fingers being all of the same pattern and interchangeable. The teeth and notches not only give a sure grip of the jaws, but also serve to prevent the rod or needle from rotating out of place.

The cross-bar E is fixed in the frame just below the carrier C, and is provided with an upwardly and backwardly extending lip, E', having along its edge a series of indentations or openings, $e$, through which the needles pass. (See Figs. 1, 4, 8, 9, 10, 12, and 13.)

Extending along the back of the bar, and supported thereon, is the vertically-movable comb or indented plate F, having upward-projecting points or teeth, which are bent over, backward, and downward, forming a series of hooks, $f$, to receive the back of the signature and support it in position while the needles are forced through it. The indentations in the plate F correspond with those in the bar E. At the ends of said plate are lifting-blocks grooved or furnished with hooks $f'$, that work in conjunction with spring-guides or elastic cam-bars F', attached to the under side of the carrier C, whereby said comb-plate is raised and depressed as the carrier moves back and forth. The elasticity or springing action of the cam-bars F' accommodates the variations in thickness of the different signatures, so that the binding-wire $w$ will be delivered and supported at the same position in relation to the needles, whether the signature contains a greater or less number of folios or leaves, the variation being accommodated by the slight springing up of the front ends of said bars F'. The form of the cam-bar F' is indicated in Figs. 7 and 10. Its shape is such that the comb F is depressed when the carrier C is at its backward position, held at position while the needles are passing through the signatures and the carrier is advancing over the bar, and then elevated when the carrier is at forward position, so that as the carrier starts on its backward movement the signature is released to be carried backward by the needles. The holes and indents in the bar E are preferably made slightly tapering, the better to sustain and guide the needles in their passage through.

The carrier-plate D, by which the strand of binding-wire is laid into the back of the signatures, is arranged substantially as shown in Figs. 4, 14, 16, 17, and 18, and consists of a thin rectangular sheet of steel about one-tenth of an inch (more or less) in thickness, centrally pivoted at $d$ upon a vertically-reciprocating support or bar, D', which works up and down below the cross-bar E in such position that the upward movement will bring the edge of the strand-carrier plate up under the hooks $f$ of the comb-plate. The edge of the carrier-plate is indented to correspond with the indentations in said comb-plate, to allow space for the passage of the needles under the wire, and a groove is formed along the edges into which the binding-wire is laid, and whereby said wire is supported until sewed into the signatures by the needles N. Small studs $s$, of vulcanized fiber, are inserted in the bar D', against the ends of which the rear side of the strand-carrier plate D runs. Said studs sustain the plate from vibrating and cause it to run true and accurate, and also serve as anti-friction bearers, causing the plate to work easy and obviating the necessity of using oil in connection with the plate, which would soil the paper of the signature.

Upward and downward movement is imparted to the strand-carrying mechanism by means of a lever, $D^2$, actuated by the cam $B^2$ on the shaft B. An adjustable stop, $h$, is fixed to the side of the frame to arrest the upward movement of the strand-carrier when at the proper position to allow the points of the needles to just pass under the binding-wire, and the adjustment of the stop permits of the parts being set so as to give accuracy in the relation of the binding-wire and needles. The lever is linked to the carrier-support by a yielding or compressible link, $D^3$, (see Fig. 5,) so that when the carrier-bar D' strikes the stop which arrests its upward movement when the signature is brought to position against the comb-plate F the connection can yield, and thus avoid strain on the parts of the mechanism. The yielding link $D^3$ in the present instance consists of a bolt, $d^4$, telescoping within a tube, $d^5$, with a spiral spring, $d^6$, arranged within the tube for forcing the bolt upward. A small stud, $d^7$, set into the side of the bolt and playing in a slot in the side of the tube, retains the parts in connection. The strand-carrier plate is rotated on its pivotal center as its supporting-bar moves downward by means of an arm, H, fulcrumed on the pivoting-stud $d$, and provided at its outer end with a roll, H', that enters a stationary curved groove or cam, $H^2$, on the front of the frame, and which imparts movement to said arm in an arc of about a quarter of a circle. The arm is provided with a spring-latch, $H^3$, which catches into ratchets or notches $d'$ in the side of the strand-carrier plate D, and carries around said plate in accordance with the rotary movement of the arm. The carrier-plate is retained from rotating backward by means of a spring-latch, J, fixed to the supporting-bar D', with its vibrating end extending through said bar and engaging ratchets or notches $j$, formed in the back of the carrier-plate. (See Figs. 17 and 18.)

The wire-holding devices K at the angles of the plate D are in the present instance constructed, as shown in Figs. 19 and 20, of steel plates riveted together, one plate being formed with side tongues, K', and the other with a center tongue, $K^2$, which tongues are disposed in relation to each other, as shown, so that the wire can be drawn in and wedged between them, the tongues acting as holders, and also as shearing-cutters for cutting off and discharging the pieces of wire when the tongues are pressed together. The edges of the plates K are beveled, and the devices are retained in connection with the plate D by setting them into undercut grooves or recesses, in the manner shown. (See Figs. 14 and 20.) The strand of binding-wire $w$ (which is about No. 36 wire gage, more or less,) is led from a spool, $w'$, and delivered to the carrier-plate D from a guiding and tension mechanism connected with the supporting-bar D', and constructed substantially as shown in Figs. 14, 15, and 16. The wire passes upward beneath a spring, L, and then over a circular grooved guide, L', the discharging-point $l$ of which is turned outward into line with the carrying-groove in the edge of the plate, so that the wire will be drawn into said groove, and also into the space between the holder-fingers K' and $K^2$ when the carrier-plate is turned over by the action of the arm H. A set-screw, $J^2$, is provided for regulating the pressure of the spring L upon the wire, and thus adjusting the mechanism for giving the tension desired. A plate, $L^2$, having an inclined inner surface, is attached to the bar D', and projects in front of the guide L' in such manner that the wire-holder K passes between said plate and the guide as the carrier-plate revolves, and the inclined surfaces act upon the tongues K' and $K^2$, forcing them together for cutting off and discharging the waste piece of wire $w^3$ held between said tongues. A tongue or blade, $L^3$, is fixed to the bar D' below the plate $L^2$, in a position to enter between the tongues K' and $K^2$ for separating them, so that the wire will be drawn in between them to a position where it will be securely held by the springing inward of the tongues when they pass off from the end of the blade.

The device on which the signatures are fed into the machine consists of two plates, M, arranged in inclined position, their upper edges adjacent to each other and their lower edges attached to bearings $m$, which respectively run on guide-rods M', extending across the machine parallel with each other, and at such distance apart that the strand-carrying mechanism can pass up and down between them. The two plates or leaves are secured together at their rear edges, while their upper edges are separable or free to spring apart and allow the edge of the strand-carrier to pass up between them. The guide-rods M' extend outward beyond the side frame, and the feed-plates have a reciprocating movement along said rods from a position as shown in Fig. 4 to a position immediately under the overhanging hooks of the comb-plate. The motion is imparted to the feed-plates by means of a series of links and levers, $m^4$, $m^5$, $m^6$, and $m^7$, actuated from a cam, $B^t$, mounted on the shaft B. The bearings $m$, which run on the guide-rods, are preferably provided with anti-friction bushings or linings $m^2$, of vulcanized fiber or other suitable material, so that they can be operated without oiling the rods.

The plates M are preferably made of quite thin sheet metal, so as to be light and to offer as little inertial resistance as practical, and their upper edges are preferably arranged to spring together and to separate by flexure of the plates; but said plates might be arranged so as to swing apart, or so as to stand at a slight distance apart, sufficient for the entrance between them of carrier-plate D when pressing the signature against the comb plate or holder F.

Attached to the bracket or frame $A^2$, which supports the outer ends of the rods, is a tongue or thin bar of metal, $M^2$, introduced between the upper edges of the plates M, (see Figs. 23 and 24,) having its upper edge parallel with and slightly higher than the upper edge of the plates. Said tongue or bar serves as a guide for the signatures, and its inner end terminates at a position near the end of the comb-plate.

In some instances the tongue or plate $M^2$ may be omitted, as it is not essential to the successful operation of the machine that said tongue should be used, although we prefer to use it, as it renders the feed mechanism more substantial and less subject to vibrations.

An adjustable stop or gage, P, is attached to one of the feed-plates M, against which the head of the signature is placed for bringing it into proper position for receiving the sewing mechanism. The end of said gage is provided with light wire springs or fingers P', which curve over and rest upon the paper of the signature, giving a slight pressure to retain the signature from moving or being blown out of place by the movement of the feed mechanism.

A guide or pulley, O, is located above the feed-plates, to serve to keep the fold of the signature down upon the angle of the plates as they are fed into the machine. Said guide or roll O is grooved on its face, and is disposed in such relation to the adjacent top edges of the plate M as to embrace the fold of the signature as the feed device moves forward, thereby causing the fold of the signature to take central position thereon, and confining it in such manner that it will be delivered accurately under the hooks $f$ of the comb-plate F.

Motion is imparted to the cam-shaft B from the shaft R, upon which the driving-pulleys R' are located, by means of gears $r$ and $R^2$.

A suitable treadle mechanism, Q, is provided for shifting the belt on the driving-pulleys or operating the clutch, when a clutch is used for starting the machine into operation.

The table G extends rearward from the head of the machine to any desired distance parallel with and at such distance below the needles as may be required for conveniently holding the signatures. The forward end of said table is supported on a vertically-adjustable screw or standard, G', mounted on a movable transom, $A^3$, that runs back and forth in guides on the main frame A, and is connected with side frames, A', the top bars of which extend along parallel with the needles and are attached to the head or carrier C, so that said side frames, sliding transom, and table G will all have reciprocating movement corresponding to the movement of the carrier and needles. The rear end of the table is supported by a standard, G³, having a vertically-adjustable cap, G², provided with guideways in which dovetailed or interlocking guide-strips g, attached to the under side of the table, are supported and slide as the table moves back and forth. Anti-friction rolls may be used in connection with the guides g, if desired. By means of the adjustable standards the table can be raised or depressed to or from the needles, so that the distance from the needles to the table will correspond to the width of the signatures.

A pusher or toothed bar, T, extends across from one of the side frames to the other, and is provided with long arms t, connected to the upper ends of angle-levers T′, fulcrumed on the side frame in the manner indicated, and serves for drawing off the books of signatures from the ends of the needles onto the bands N′, the bar being lifted up and its teeth inserted between the books, as required. The lower arm of the angle-lever T′ is connected by a rod, T², with a foot-treadle, T³, so that the force required for drawing off the books can be imparted by the foot of the attendant pressing down on said treadle.

The cutters V, which serve for cutting off the binding-wire in the back of the signatures, are formed as indicated in Fig. 21, and are attached to the needle-carrier C, so as to pass transversely through the back of the signature immediately after the points of the needle have been inserted under said wire as the carrier moves forward.

Bending-tools X are connected with the carrier C adjacent to the cutters, the points of which are forced through the signatures for drawing the severed ends of the binding-wire up through the backs of the signatures S, as indicated at X′ in Fig. 27. Said cutters and benders are in the present instance secured to the carrier by having their shanks inserted in suitable openings, x, formed in the front bar of the carrier, where they are clamped by set-screws v² and x², inserted in openings from the front of the carrier, as indicated in Figs. 7, 8, and 9, or in other suitable manner.

If preferred, the cutters and benders may be formed on a plate or blocks to be screwed to the front of the carrier, or may be attached thereto in other suitable manner, their working blades or points being of equivalent form to that shown, so that they act upon the wire in the manner set forth.

A series of openings are formed along the carrier-bar for the cutters V, benders X, and their set-screws, so that said parts can be adjusted at different positions as required for different sizes of books.

Swinging arms or clinching devices Y are pivoted to the back of the carrier C, which devices are actuated by an incline or cam surface, Y′, formed on or attached to the frame A, when the carrier C is moved back to its rearmost position for bending down the projecting ends of the binding-wire, drawn up through the back of the signature by the points X. The form of said devices is indicated in Fig. 11.

A suitable spring is provided for returning the clinching devices Y to normal position when their upper ends are relieved from the cam-surface. In the present instance the spring is disposed within a cavity formed on the inner side of the clinching devices. (See Fig. 10 and dotted lines in Figs. 9 and 11.)

A mechanism is provided for automatic action to indicate whether or not the binding-wire is in proper position for presentation to the signature. Said mechanism in the present instance consists of a rocker-rod, Z, supported in suitable bearings on the frame of the machine in horizontal position, and furnished at its outer end with an arm carrying a hammer or striker for sounding the bell Z′, (see Fig. 6,) and its inner end having a feeler or finger, z, that passes across the edge of the strand-carrier D, as indicated in full lines, Fig. 6. If the wire w is in position, said feeler z being pressed toward the strand-carrier by a suitable spring or weight, the mechanism is unresponsive; but if the wire is absent, then the feeler falls into the indent in the edge of the strand-carrier, as indicated by dotted lines on Fig. 6, and the consequent movement of the rocker causes the striking of the bell Z′, which is attached to the frame A. (See Figs. 4 and 6.) It will be understood that the feeler is adjusted so that it will conform in position with the position of one of the notches of the strand-carrier when said strand-carrier is depressed and ready to be advanced for receiving the signature. If desired, said alarm mechanism might be connected for throwing off the shipper and stopping the machine, instead of sounding a bell.

The operation of our improved book-sewing machine is, briefly, as follows: The folded signatures are placed upon the feed-plates M by opening their central fold and hanging them across the top edges of said plates, one-half on each side thereof, and the head of the signature being slipped under the spring P′ against the gage P. The machine being then started by depression of the shipper-treadle, which shifts on the driving-belt, (or throws in the clutch, if a clutch is employed in lieu of a loose pulley,) the feed-plates, with the signature thereon, advance to a position beneath the hooks f of the comb-bar F. The strand-carrier D being at the same time elevated, its edge carrying the wire w passes up between the plates M and forces the signature upward against the hooks f, where it is held securely while the feed-plates recede to their first position. The head or carrier C moves forward, projecting the needles N through the signature below the binding-wire, which latter is curved upward thereby, (see Fig. 27,) and also forcing the cutters V through the signature for severing the wire, while the points X passing under the severed ends raising them through the back of the signature at a position intermediate between the point of severance and the outer needle or band, as indicated in Fig. 27. The strand-carrier then descends and the comb-bar F is lifted by the spring-cams F², releasing the signature, so that it can be carried back on the needles N. The strand-carrier D as it descends is rotated by the action of the arm H, bringing up a side thereof, having a fresh piece of wire, $w$, strained thereon, into position for the next signature, and the short piece of wire left in the right-hand upper wire-holder is cut in two and thrown off as the holder passes the plate L³, thus clearing said holder, so it can take a new hold on the wire, which is continuously led onto the strand-carrier through the tension devices from the spool or coil $w'$. This operation is repeated as the consecutive signatures are placed in position, the signatures crowding each other along the needles as they accumulate thereon. The attendant, as the books are formed, raises the pusher T and places it in front of a book, then by placing his foot upon and depressing said treadle T³ actuates the lever T² and forces back the bar T, pushing the book from the needles onto the bands N', which are drawn into the back of the book as required, and are then cut off, leaving such portions of the band projecting therefrom as may be necessary to connect the book with its cover, the whole operation being performed in a very rapid, satisfactory, and efficient manner.

The particular construction of book-binding such as produced by this machine forms the subject-matter of a separate application for Letters Patent by us.

An intermittently-rotating plate or strand-carrier for laying a binding-wire into the backs of signatures in a book-sewing machine having been described and claimed in a Patent No. 338,726, heretofore granted to Levi W. Fifield, it will be understood that such feature is not broadly claimed herein, except in the improved construction and new combinations with other parts set forth.

What we claim as of our invention, and desire to secure by Letters Patent, is—

1. The needle carrier or head C, provided with front and rear sets of needle-holding devices, and means for gripping and releasing the needles, substantially as described, combined with a series of needles, devices adapted for supporting signatures, and mechanism for imparting motion thereto, substantially as and for the purpose set forth.

2. The reciprocating needle-carrier, the front and rear sets of gripping-fingers or needle-holding jaws, the jaw-operating bars provided with end projections or rolls, and the cam-plates $a'$, combined with the needles, a mechanism for supporting signatures, and means for imparting reciprocative movement to said carrier.

3. The combination of the needle-carrier C, provided with needle-supporting jaws, the jaw-actuating bars C², guides $a$, cam-plates $a'$, operating-levers C', links $p$, and eccentrics B', substantially as shown and described.

4. A cross-head or supporting-bed having a series of indentations or tapered openings, as $e$, combined with the needles and needle-operating mechanisms in a book-sewing machine, for the purposes set forth.

5. The supporting bed-bar E, having a lip or flange, with a series of indentations or openings along its edge, provided with a movable plate, as F, supported thereon, having a corresponding series of indentations with intermediate overhanging hooks, $f$, combined with the needles and needle-operating mechanisms in a book-sewing machine, substantially as and for the purpose set forth.

6. The combination of the signature-supporting plate, the presser-comb having a series of overhanging hooks, the series of needles, and a reciprocating needle-carrier provided with needle-gripping devices adapted to alternately seize and hold the needle and to release the needle while passing the position of the support-plate and presser, substantially as set forth.

7. The curved bars or cam-plates F', in combination with the presser-comb F, indented support-bar E, needles N, and needle-carrier, substantially as and for the purpose set forth.

8. The elastic cam-plate or spring-bar F', combined with the reciprocating needle-carrier C, needles N, signature-supporting devices, and comb-bar F, provided with lugs or lifting-hooks $f'$, engaging said cam-plate, substantially as and for the purpose set forth.

9. The combination, with means for supporting signatures in a book-sewing machine and a reciprocating needle-carrier provided with needle-gripping devices, of the needle N, constructed as described, with the forward portion, $n'$, of greater diameter of wire than the extended shaft $n^2$, or portion toward the eye, the diameter being reduced at $n$, substantially as shown, and for the purpose set forth.

10. The needle N, having the depressions $n^5$ at respectively offsetting positions on the opposite sides thereof, in combination with the signature-support and a reciprocating needle-carrier provided with the gripping-jaws I, having lugs $n^6$ disposed thereon, substantially as and for the purpose set forth.

11. The combination, with a strand-carrier having facilities for supporting a binding-strand along the fold of a signature, and a comb-bar or presser by which the signature is retained thereon, of a needle having its point straight upon the side adjacent to said carrier and its taper or bevel wholly at the opposite and lateral sides, and means for carrying said needle through the signature beneath the strand, whereby said strand is pressed into the fold of the signature as the needle-point passes through, substantially as set forth.

12. The strand-carrier plate D, mounted upon a movable support, having reciprocative action to and from the sewing-bed and needle-carrier, and means for intermittently rotating said plate on its axial center, combined with the needles, needle-carrying mechanism, and signature-supporting devices, substantially as and for the purpose set forth.

13. The combination of the comb-plate F, provided with overhanging points $f$, the vertically-movable strand-carrier or wire-delivering plate D, the indented cross-head E, and needle-carrier C, having front and rear sets of needle-gripping jaws, and the needles N, substantially as and for the purposes set forth.

14. The combination of the needles N, formed, as described, with the downward-inclined point, the large leading end $n'$, taper $n$, and following-shaft $n^2$, of smaller diameter, the carrier C, provided with front and rear sets of detaching holders or gripping-jaws, I, jaw-actuating mechanism $C^2$, indented and hooked presser F, and wire-supporting plate D, substantially as and for the purposes set forth.

15. In a book-sewing machine, a signature-feeding device composed of two separable plates, as M M, adapted to permit the passage between them, of a binding-wire, in combination with a strand-carrier, as D, provided with strand-holding devices, whereby a binding-wire is supported and delivered into the fold of the signature parallel therewith, substantially as set forth.

16. The reciprocating feeding device composed of separable plates disposed in inclined position with their top edges adjacent to each other and their lower edges supported in bearings, in combination with guides whereon said feed device is moved to and from the sewing mechanism and means for imparting reciprocative action thereto, substantially as and for the purpose set forth.

17. The combination of a vertically-movable plate supporting a binding-wire on the edge thereof and a signature-feeding device composed of upwardly-convergent inclined plates separated at their adjacent top edges to allow the passage of the wire-carrying plate to the fold of the signature, and a guard or comb bar having overhanging hooks against which the signature is retained while securing the binding-wire, substantially as set forth.

18. The combination, substantially as described, of a strand-carrier or wire-supporting plate rotatively supported on a vertically-reciprocating carrying-bar, the guard or comb plate attached to a stationary indented cross-head, a reciprocating carrier provided with needles, and a laterally-reciprocating feed device for conveying signatures to a position between said strand-carrier and comb-plate, as set forth.

19. The combination of the reciprocating needle-carrier provided with devices for alternately gripping and releasing the needle, the indented cross-bar E, the presser-comb F, the rotating strand-carrier plate D, mounted on a vertically-reciprocating support, the reciprocating feed-plates M, mounted on guides at the front and rear of said strand-carrier, and the band-carrying needles N, and means for imparting motion to said mechanism, substantially as and for the purpose set forth.

20. The combination of the wire-supporting plate or strand-carrier pivoted upon a reciprocating support-bar and a wire tension and guiding device connected with said reciprocating support, substantially as and for the purpose set forth.

21. The combination, with the strand-carrier plate D, mounted on a reciprocating support-bar and provided with notches $d'$, of the crank or arm H, provided with a spring-latch, $H^3$, and projecting roll $H'$, and the stationary curved guide or cam $H^2$, substantially as and for the purposes set forth.

22. The combination of the strand-carrier plate D, having notches $d'$ in one side thereof and notches $j$ in the opposite side thereof, the arm H, swinging on the carrier-axis and provided with the crank or roll $H'$ and spring-latch $H^3$, the cam-guide $H^2$, spring-latch J, fixed on the support-bar $d'$ and engaging notches $j$, and means for reciprocating said support-bar, substantially as set forth.

23. In a book-sewing machine, the combination, with the strand-carrier plate, of a wire-holder comprising means for both holding and cutting off the wire held thereby.

24. The combination, with the strand-carrier and means for rotating said strand-carrier, in a book-sewing machine, of the wire-holder K, constructed, as shown, with the oppositely-shearing tongues $K'$ and $K^2$, substantially as and for the purpose set forth.

25. In a book-sewing machine, the combination of a strand-carrier provided at its angles with wire-holding devices having oppositely-shearing tongues, means for imparting rotative action to said strand-carrier, and a compressor with which said tongues engage and are pressed together upon rotation of the strand-carrier plate, thereby cutting the wire, substantially as set forth.

26. The combination of the strand-carrier plate D, provided with means for effecting rotation thereof, the wire holding and cutting devices K, the guide $L'$, having an outwardly-inclined point, $l$, and the plate $L^2$, having an inwardly-inclined surface, between which and the guide $L'$ the holding device K passes as the plate D revolves, substantially as and for the purpose set forth.

27. The combination, with the strand-carrier D, provided with the groove and wire holding and cutting devices at the angles thereof, and means for rotating said strand-carrier, of the wire-guide $L'$, having the outwardly-inclined point $l$, and the adjustable tension-spring L, attached to the carrier-supporting bar D, substantially as and for the purpose set forth.

28. In a book-sewing machine, the combination, with the strand-carrier D, provided with the wire-holding cutters K at the angles thereof, and means for rotating said strand-carrier, of a pressing device adapted for closing the tongues of said cutters, a blade for opening the tongues, a guide for directing the wire between said tongues and into the carrier-groove, and a spring for giving tension on the wire, substantially as hereinbefore set forth.

29. The combination, in a book-sewing machine, of a reciprocating signature-feeding device composed of converging surfaces over which the fold of the signature is placed and a grooved guide or roller, as O, for confining the signature in position thereon, substantially as set forth.

30. The combination, with the sewing and wire-carrying mechanisms and a reciprocating signature-feeding device composed of upwardly-converging plates, of an adjustable gage connected with one of said plates, substantially as and for the purpose set forth.

31. The combination, with the sewing and wire-carrying mechanisms and a reciprocating signature-feeding device composed of upwardly-converging plates M, of a gage, P, provided with overhanging spring-fingers P', substantially as and for the purposes set forth.

32. The cutters V, combined with the needle-carrier C, the comb-plate F, indented cross-bar E, and means for reciprocating said needle-carrier, for the purposes set forth.

33. The combination of the wire-supporting plate having means for delivering a binding-wire strand into the back fold of the signature, a series of band-carrying needles, the needle-carrier, cutting devices attached to said carrier for severing the wire within the back of the signature, and a bending-tool operated in conjunction with said carrier for puncturing the fold and withdrawing the severed end of the wire outward through the back of the signature, substantially as set forth.

34. The combination, in a book-sewing machine, of a wire-cutting blade, a bending-hook for raising the severed end of the binding-wire through the back of the signature, and means, substantially as described, for operating said bending-hook and cutting-blade, and a clinching mechanism adapted for turning the raised end of the wire backward and downward upon the outside of the signature, substantially as hereinbefore set forth.

35. The combination of the reciprocating needle-carrier C, the needles N, the wire-cutting blade V, the bender X, the clinching-finger Y, and the incline or cam surface Y', substantially as and for the purposes set forth.

36. The combination, with the reciprocating needle-carrier C and the needles N, of the table G, vertically-adjustable table-supporting standard G', mounted on the sliding transom $A^3$, and the side frames, A', connected with said transom and needle-carrier, substantially as and for the purpose set forth.

37. The combination, with the reciprocating needle-carrier C and needles N, of the side frame, A', transom $A^3$, vertically-adjustable standard G', and table G, provided with guides $g$, and the standard $G^3$, provided with a vertically-adjustable cap having guideways formed therein, within which said guides slide with the reciprocating movement of the table.

38. The combination of the strand-carrier D, reciprocating carrier-supporting bar D', operating-cam $B^2$, lever $D^2$, and yielding connection $D^3$, substantially as and for the purposes set forth.

39. The combination, with the needle-carrier C, needle-grippers I, and gripper-operating bars $C^2$, of the adjustable controlling-cam $a'$ and adjusting-screws $b^2$ $a^3$, substantially as and for the purposes set forth.

40. The combination, with sewing-needles and signature-holding devices, in a book-sewing machine, of the reciprocating signature-feeding device M and its guide-rods M', provided with the anti-friction bearings or bushings $m^2$, of vulcanized fiber, substantially as set forth.

41. The combination, with the needles, in a book-sewing machine, of a pusher or comb bar transversely disposed in relation to said needles and adapted to be entered between the books of signatures strung upon said needles for transferring the books of signatures from the needles to the bands threaded therein, substantially as set forth.

42. The combination, in a book-sewing machine, of the indented strand-carrier or supporting-plate B, the rocker Z, having the finger $z$ and striker-arm, and the bell Z', substantially as and for the purpose set forth.

43. The combination, with the needles N, side frames, A', and table G, of the pusher T, angle-lever T', connecting-rod $T^2$, and treadle $T^3$, substantially as and for the purpose set forth.

44. The combination, with the strand-carrier plate D and its supporting-bar D', of the bearing-studs $s$, of vulcanized fiber, substantially as and for the purpose set forth.

Witness our hands this 18th day of August, A. D. 1886.

LEVI W. FIFIELD.
ARTHUR I. JACOBS.

Witnesses:
CHAS. H. BURLEIGH,
ELLA P. BLENUS.